Jan. 17, 1928.                                                        1,656,563
P. KOPPE
RECOVERY OF SULPHUR FROM AMMONIUM POLYSULPHIDE
Filed April 7, 1927
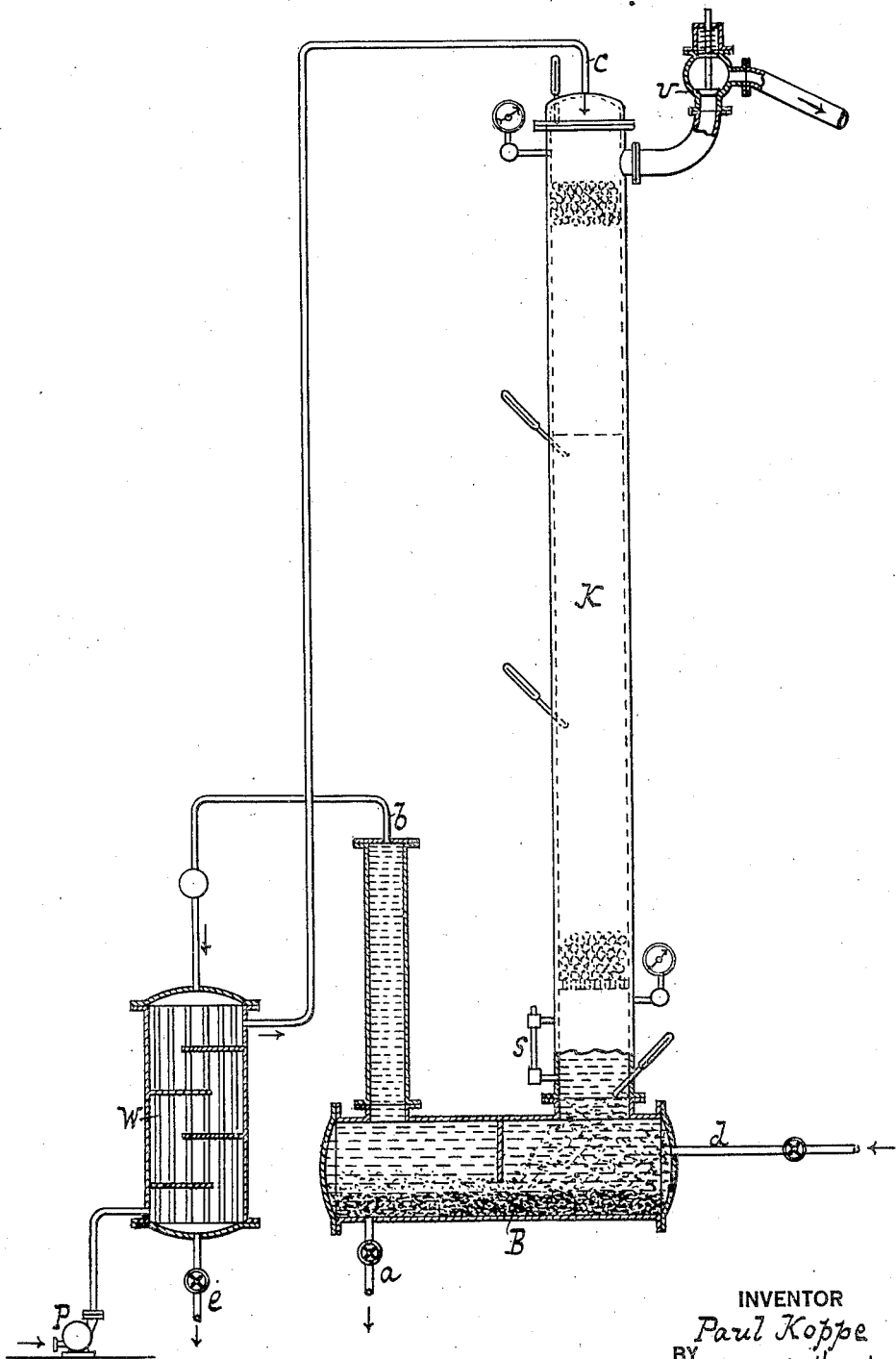
INVENTOR
Paul Koppe
BY
ATTORNEYS Patented Jan. 17, 1928.

1,656,563

UNITED STATES PATENT OFFICE.

PAUL KOPPE, OF NEUROSSEN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

RECOVERY OF SULPHUR FROM AMMONIUM POLYSULPHIDE.

Application filed April 7, 1927, Serial No. 181,852, and in Germany April 16, 1926.

In the German Patent No. 428,087 we have described a process for the recovery of sulphur from solutions of ammonium polysulphides, in which these are introduced into a liquid in a closed chamber maintained at a temperature higher than the melting point of sulphur, and under ordinary or increased pressure.

I have now found that, for the purpose of recovering sulphur, these solutions of ammonium polysulphides may be advantageously treated by a counter-current of direct steam in a column still, in which the pressure is maintained at such a level that the sulphur separates out at temperatures above its melting point, the deposition of solid sulphur inside the still being thereby prevented. The liquid sulphur flows down, in the form of drops, with the rest of the solution, and collects in the lowest part of the column, which is preferably widened at that part, the sulphur being then removed either continuously or intermittently. The effluent water of the solution, free from ammonium sulphide and increased by the water resulting from condensation of the steam, must also be discharged from the bottom end of the column, care being taken, by providing, for example, a pipe of suitable length and width extending in the upward direction, to prevent particles of sulphur being carried away in the water, since these would choke the expansion valve. The effluent water being practically pure, its temperature corresponds to the boiling point of water at the pressure prevailing in the column, and may be utilized for preheating the polysulphide solution, which is to be decomposed, in a heat-exchanging apparatus.

A mixture of gas and vapors, consisting of ammonia, sulphuretted hydrogen and water, and containing a smaller amount of water than the ammonium sulphide solution employed for preparing the polysulphide solution, issues from the head of the column. The water content of this mixture depends on the ratio existing between the amounts of employed steam and original solution to be decomposed, and on the still temperature, and may vary within wide limits. It is desirable, with a view to economizing steam, that the escaping vapors should contain as little water as possible.

The total pressure prevailing in the column is generally about one and a half atmospheres, but it may be slightly lower, or if desired somewhat higher. The pressure set up during the process is several tenths of an atmosphere higher at the bottom of the apparatus than at the head, according to the type of column and the amounts of steam and solution admitted. There is no choking of the apparatus by solid sulphur, even if the melting temperature should not be attained at the spot where sulphur first begins to separate out from the solution, since the particles of sulphur are in such a finely divided state that they are flushed down by the solution, thus reach regions of higher temperature, where they become liquid. Moreover any deposition of solid sulphur is easily remedied by increasing the ratio of steam to polysulphide solution.

I will further describe my invention with reference to the accompanying drawing which illustrates in elevation by way of example a preferred form of apparatus but the invention is not restricted thereto. K is a column still, which preferably consists of a surface column of the simplest type, that is to say a pipe filled with substances presenting the smoothest possible surface, such as porcelain balls, Rasching rings or the like. Filling members of aluminium, or other material which is immune to the action of ammonium sulphides, may also be used. Or in place of a column as aforesaid, others may be used provided, for example, with perforated trays, or with bell trays as regards the upper part of the said column.

Steam at a pressure of 2 to 3 atmospheres is admitted by a pipe at $d$, and passes first through the accumulated water, thereby expelling the last traces of ammonium sulphide therefrom. The liquid sulphur collects in the bottom of a receptacle B at the base of the column K whence it is drawn off through the valve $a$. The water issuing at $b$, parts with its heat to the fresh ammonium polysulphide solution in a heat exchanger W, and is subsequently released continuously through the valve $e$, its level being observed through a gauge glass $s$. The water may also be removed automatically, by a suitable device or through an ascending pipe of suitable length.

The polysulphide solution, which is maintained under the necessary pressure by a pump P, enters the column, in a preheated condition, at *c* and trickles down over the filling material. The disengaged vapors of ammonia, sulphuretted hydrogen and steam, leave the apparatus through the excess-pressure valve *v*, and are condensed in a condenser by injecting water, dilute ammonia or ammonium sulphide solution. The excess-pressure valve may be replaced, for regulating the pressure in the column, by a column of the condensate about 15 metres in height, according to the German Patent No. 428,983.

By means of the process described, the liquid sulphur can be recovered from a solution of ammonium polysulphide with only about one-half to one-third the amount of steam required in the case of indirect heating. This naturally implies a considerable reduction in the cost of producing the sulphur. Moreover, the present process affords various other advantages. As a rule, a steam pressure of 2 to 3 atmospheres will be sufficient, and therefore the apparatus need be constructed to stand a maximum pressure of only 3 atmospheres. Owing to the direct method of heating, and the decomposition of the solution by steam, the apparatus is very simple in construction, no heating coils or other heating apparatus being required, and consequently, there are practically no repairs necessary. Since highly concentrated ammonium sulphide vapors are continuously recovered, they can be converted, by absorption in water or a dilute solution of ammonium sulphide, into a solution of any desired concentration, suitable, for example, as an initial solution for extracting sulphur from materials containing the same. In this manner the separate consumption of steam for concentrating the solutions of ammonium sulphide is spared.

Since, apart from small amounts of water, the ammonium sulphide alone is distilled out of the ammonium polysulphide solution, small condensers and correspondingly small quantities of cooling water suffice.

What I claim is:

The process of recovering sulphur from ammonium polysulphide solution which consists in treating said solution with steam in a counter-current under such a pressure that the sulphur is separated at temperatures above its melting point.

In testimony whereof I have hereunto set my hand.

Dr. PAUL KOPPE.